C. O. BROWNELL.
WRAPPING MACHINE.
APPLICATION FILED AUG. 2, 1918.
1,416,165.
Patented May 16, 1922.
14 SHEETS—SHEET 5.
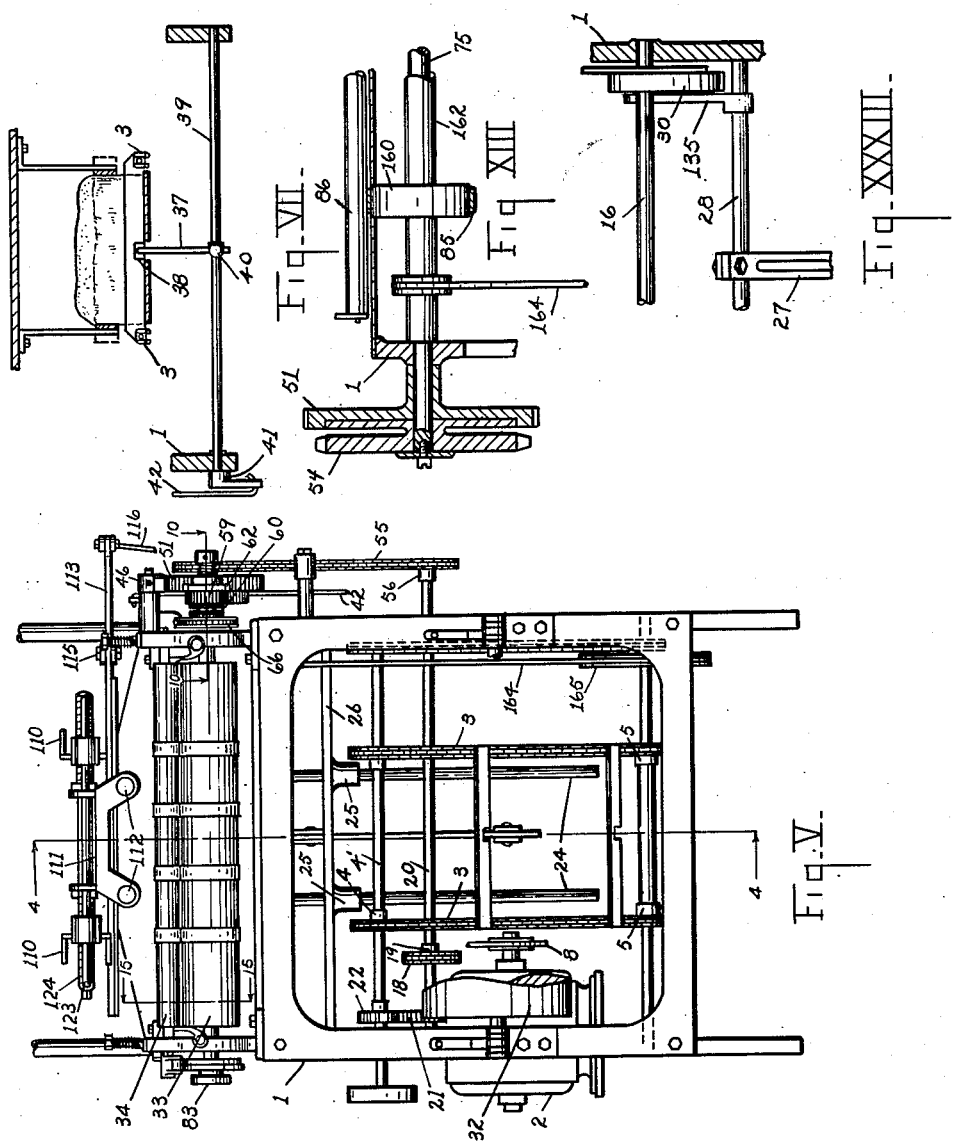
Inventor
CHARLES O. BROWNELL

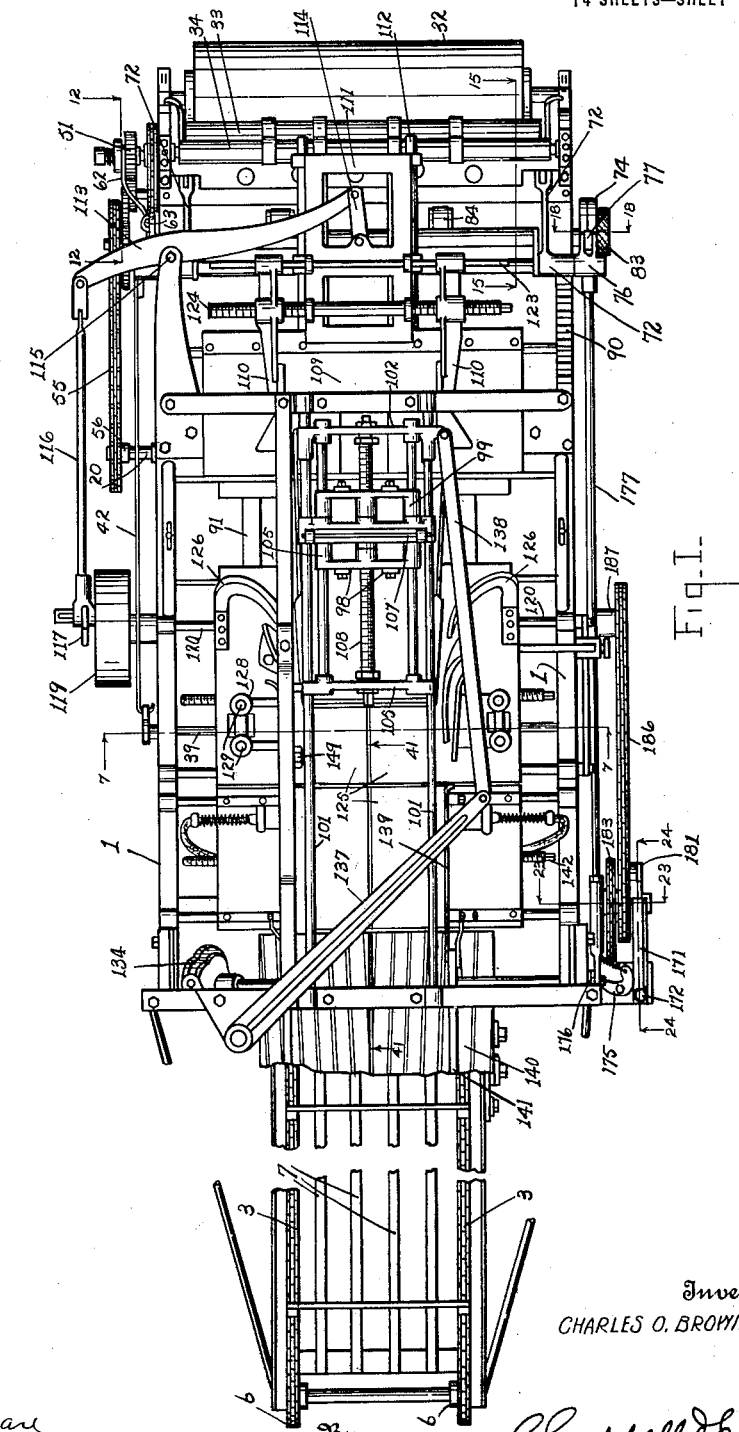

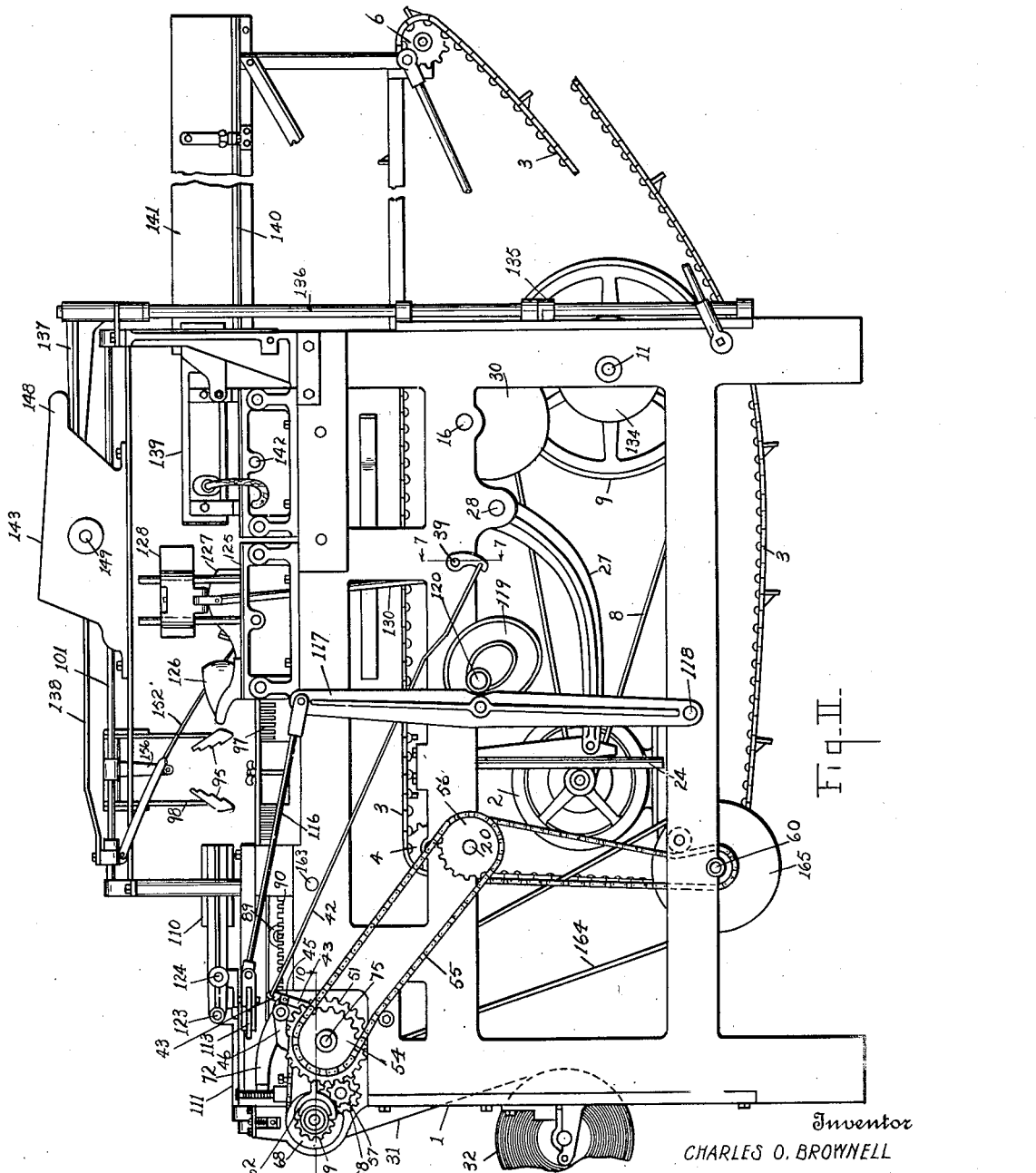

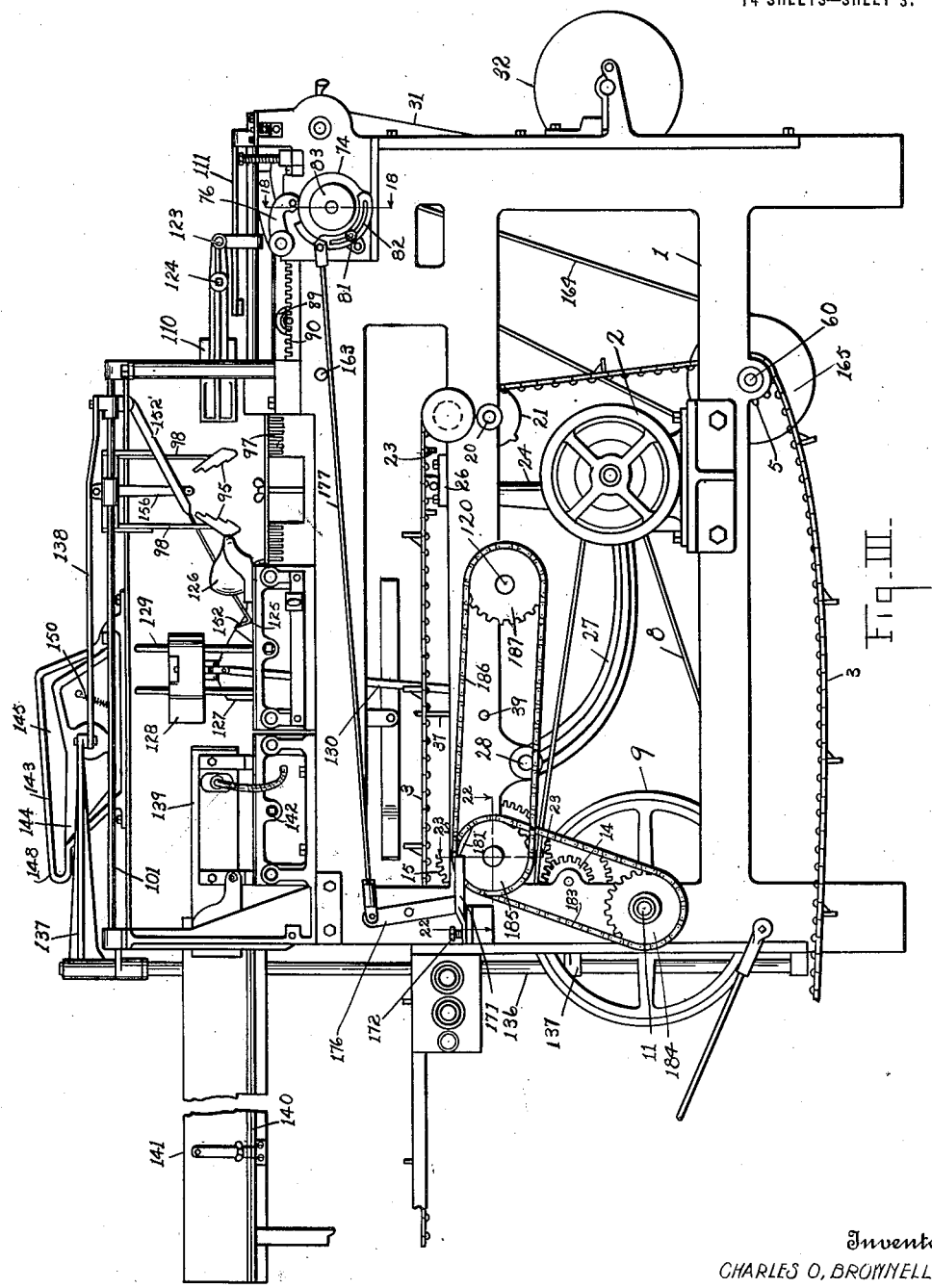

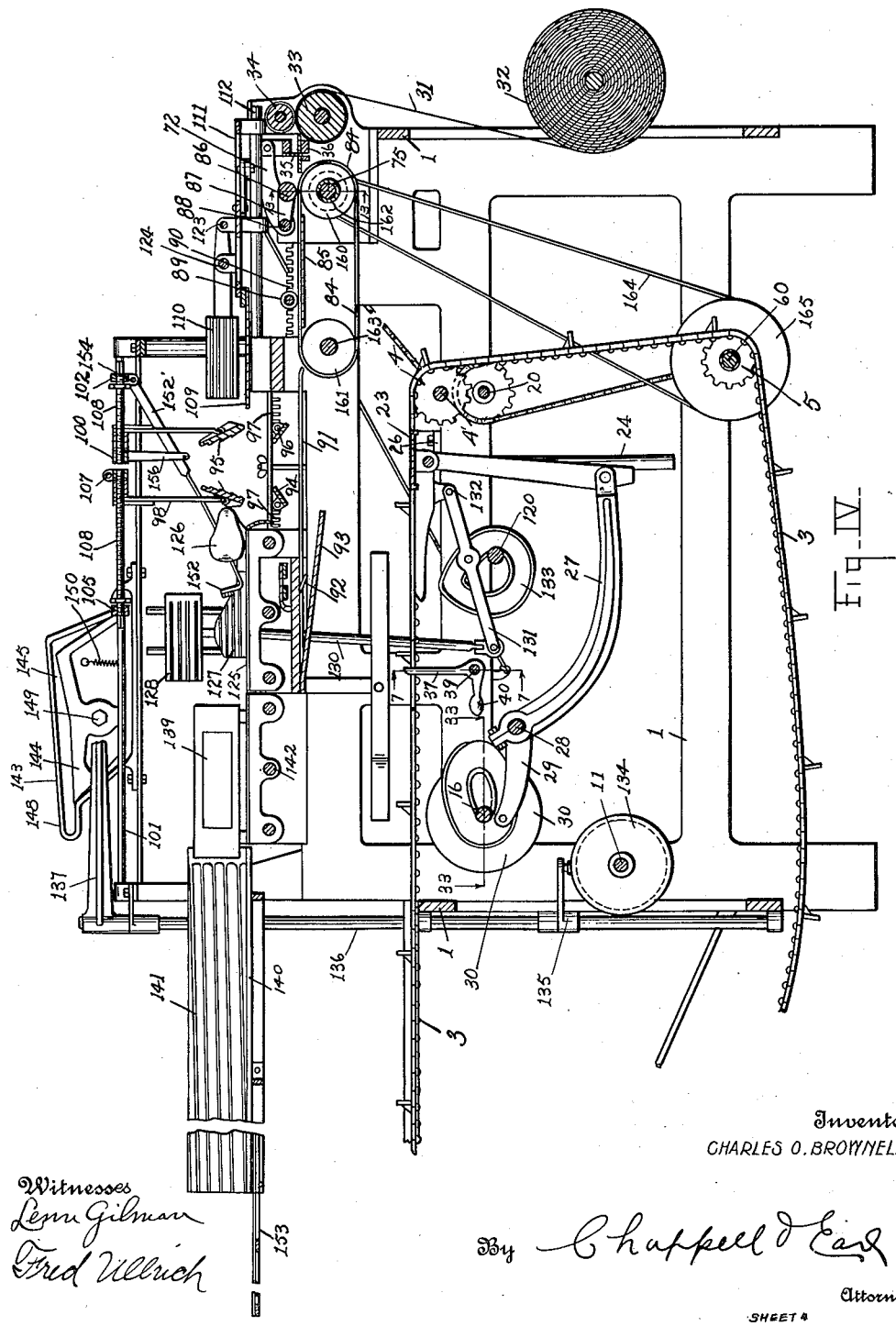

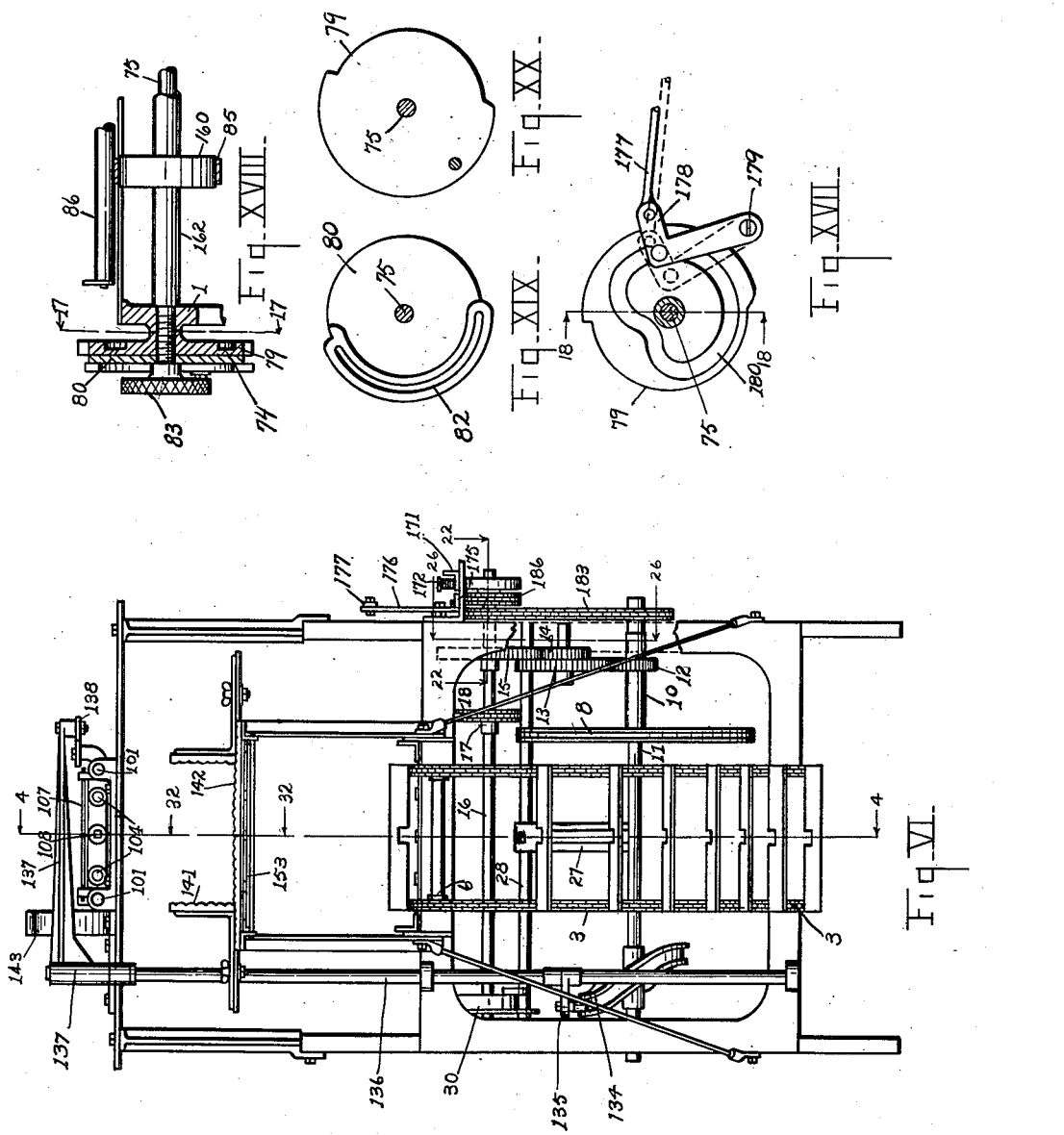

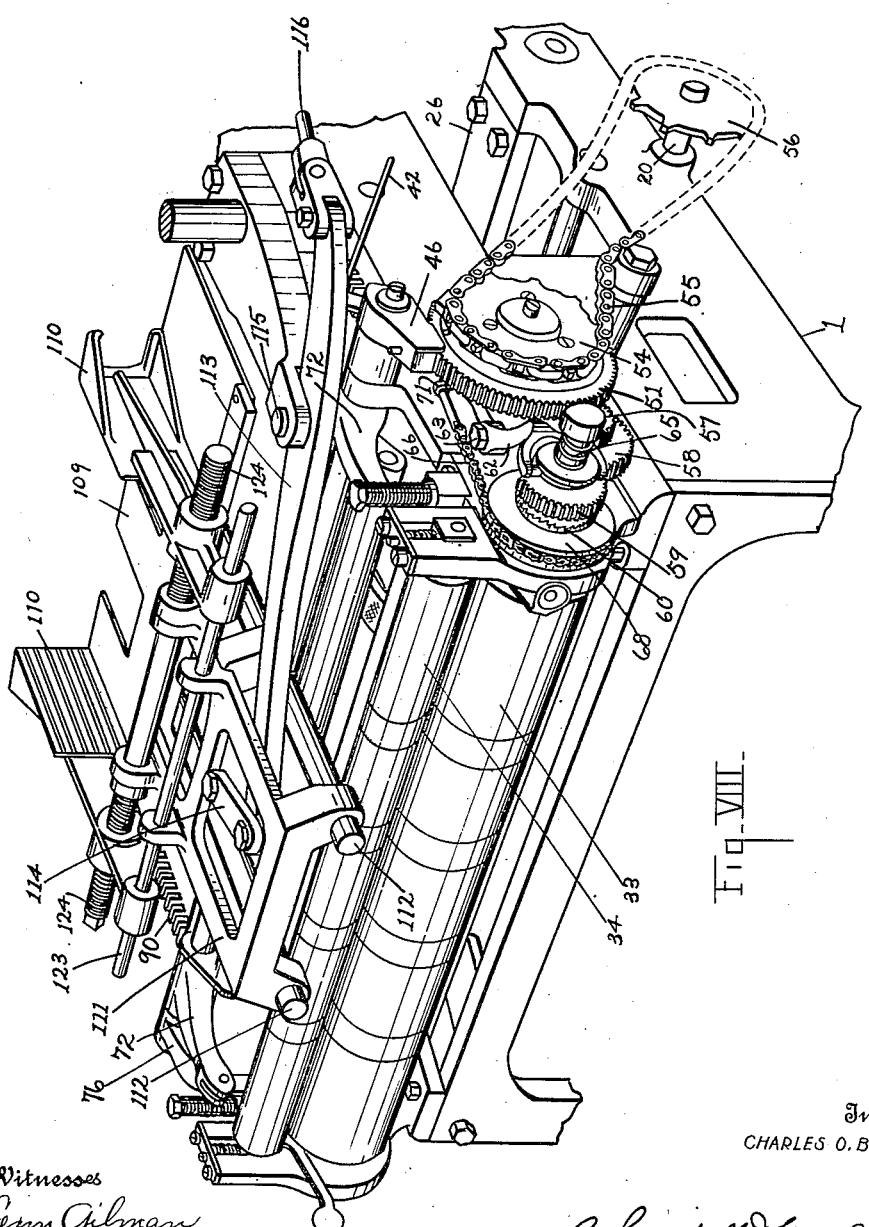

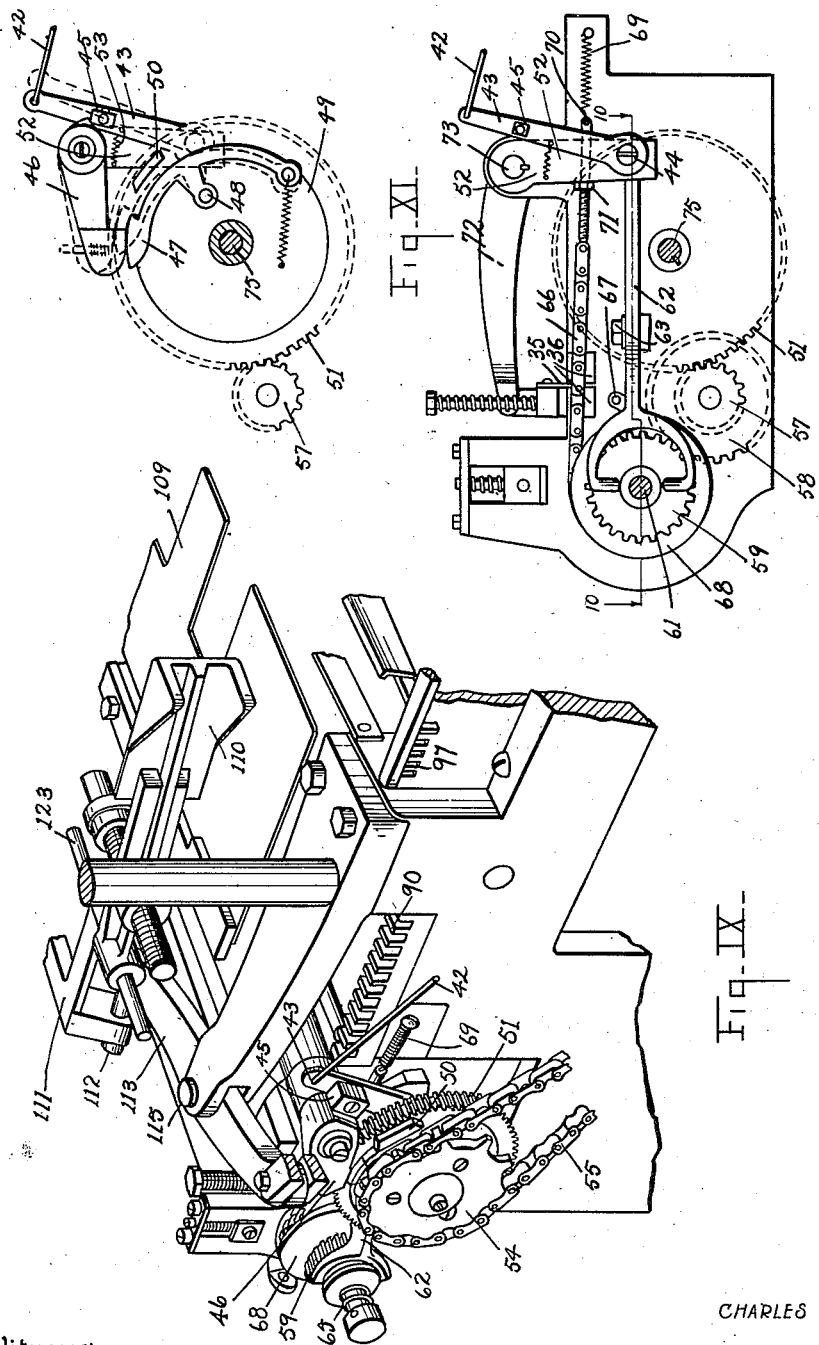

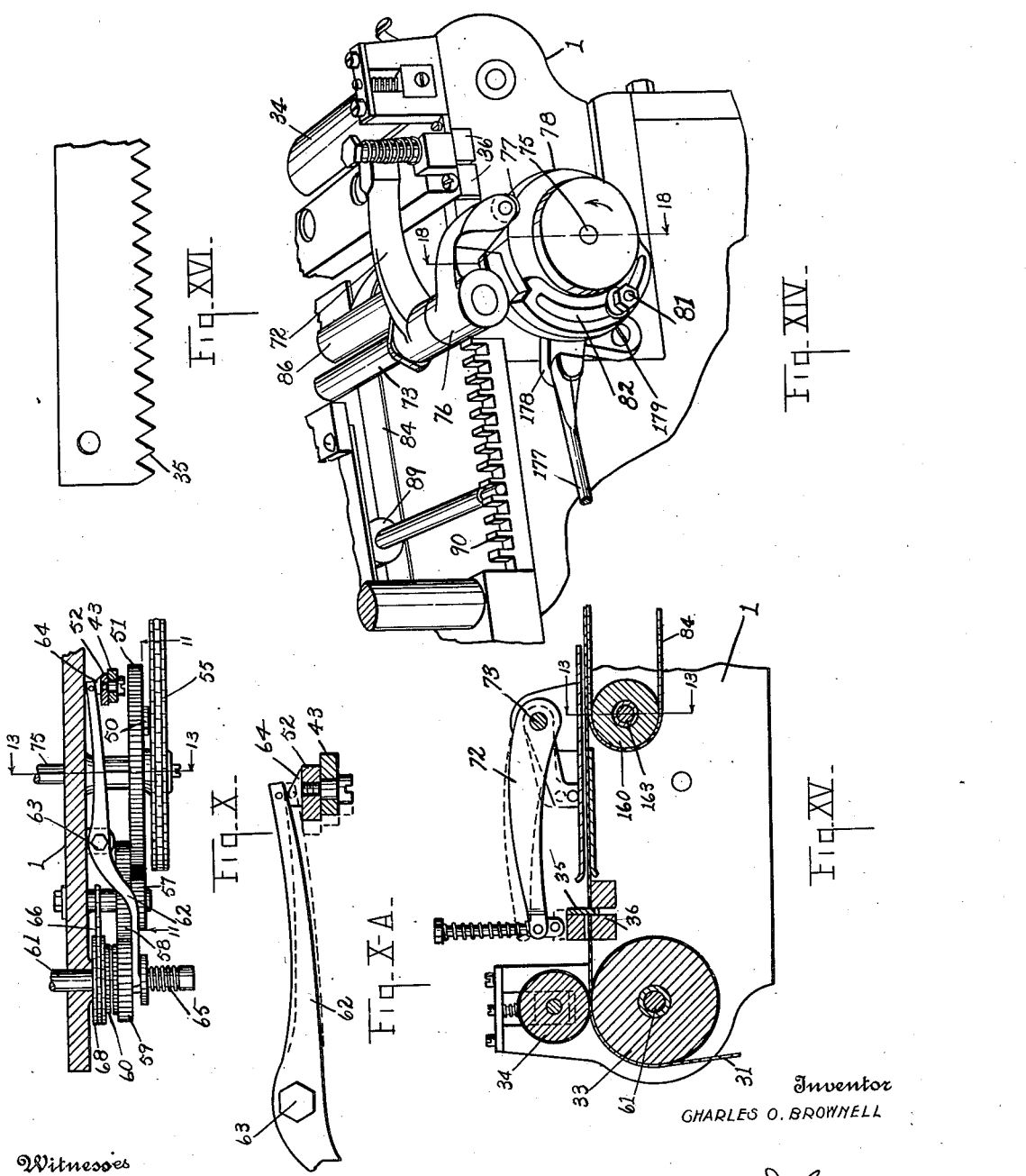

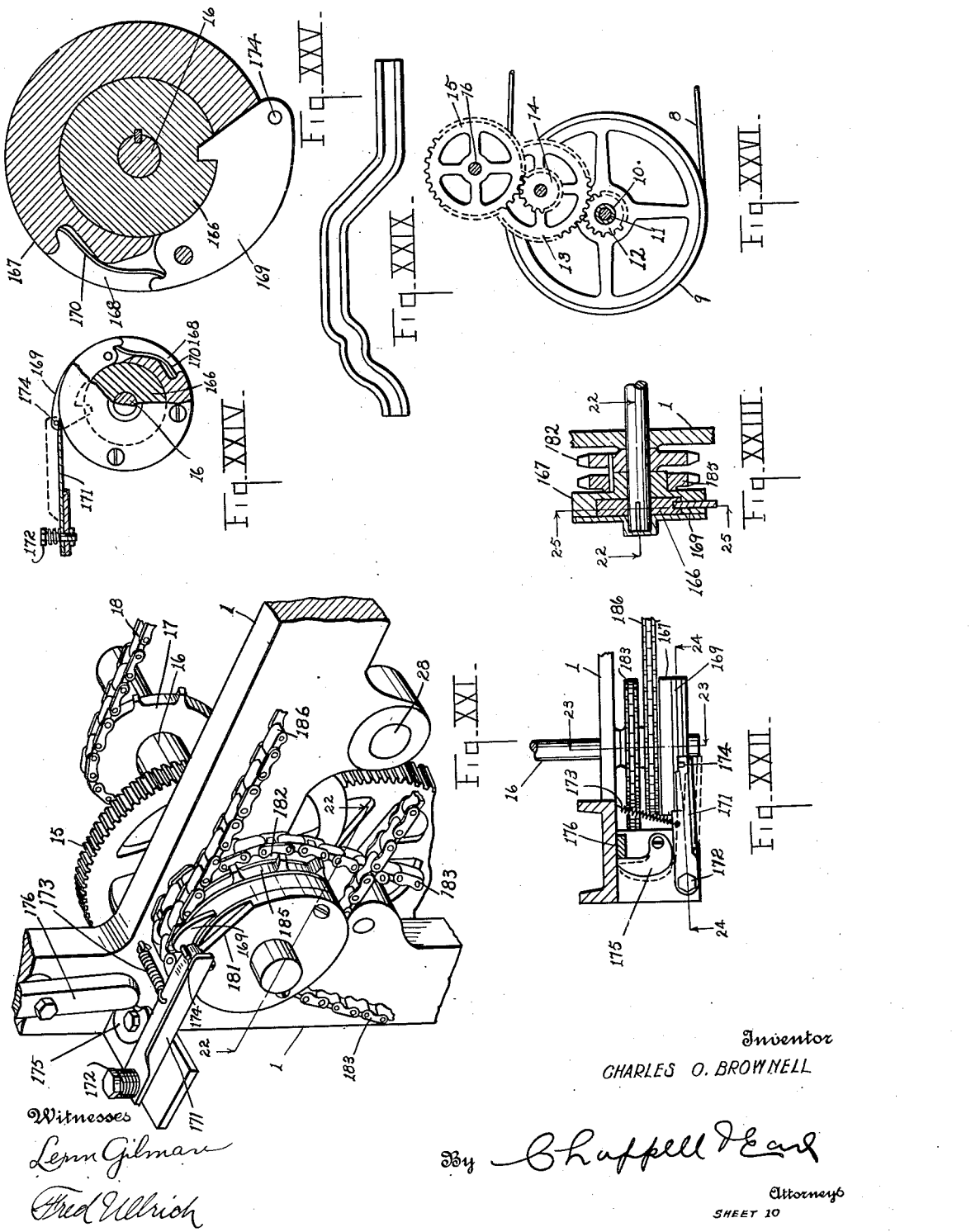

C. O. BROWNELL.
WRAPPING MACHINE.
APPLICATION FILED AUG. 2, 1918.
1,416,165.
Patented May 16, 1922.
14 SHEETS—SHEET 11.
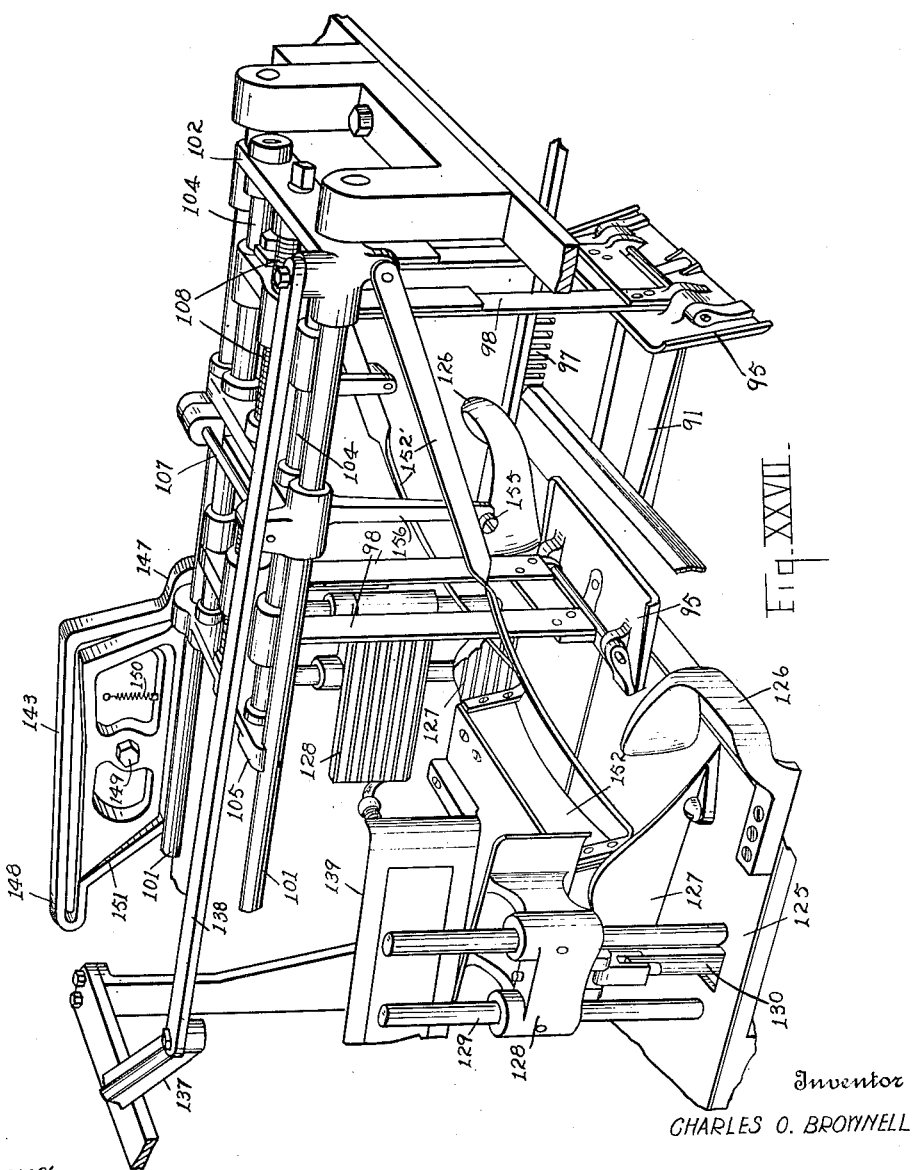

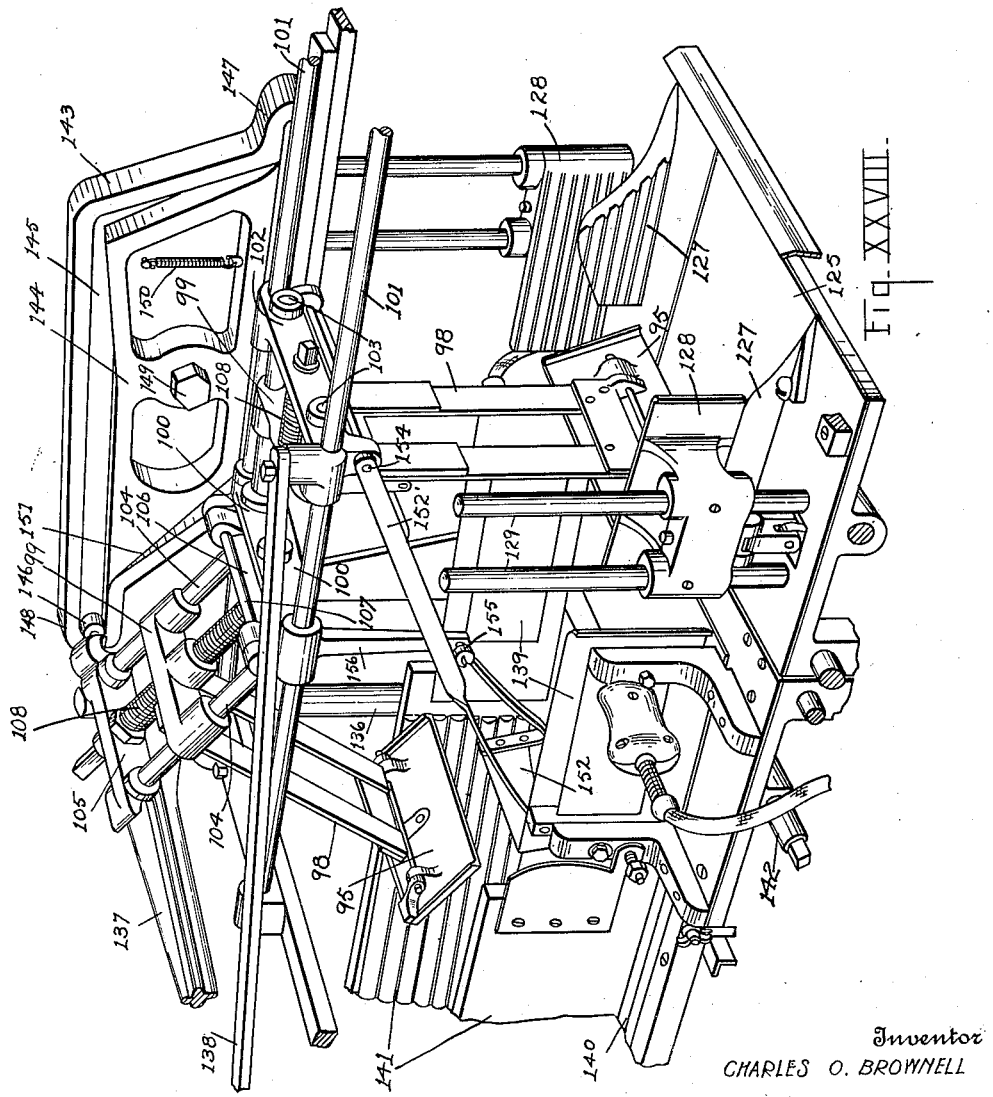

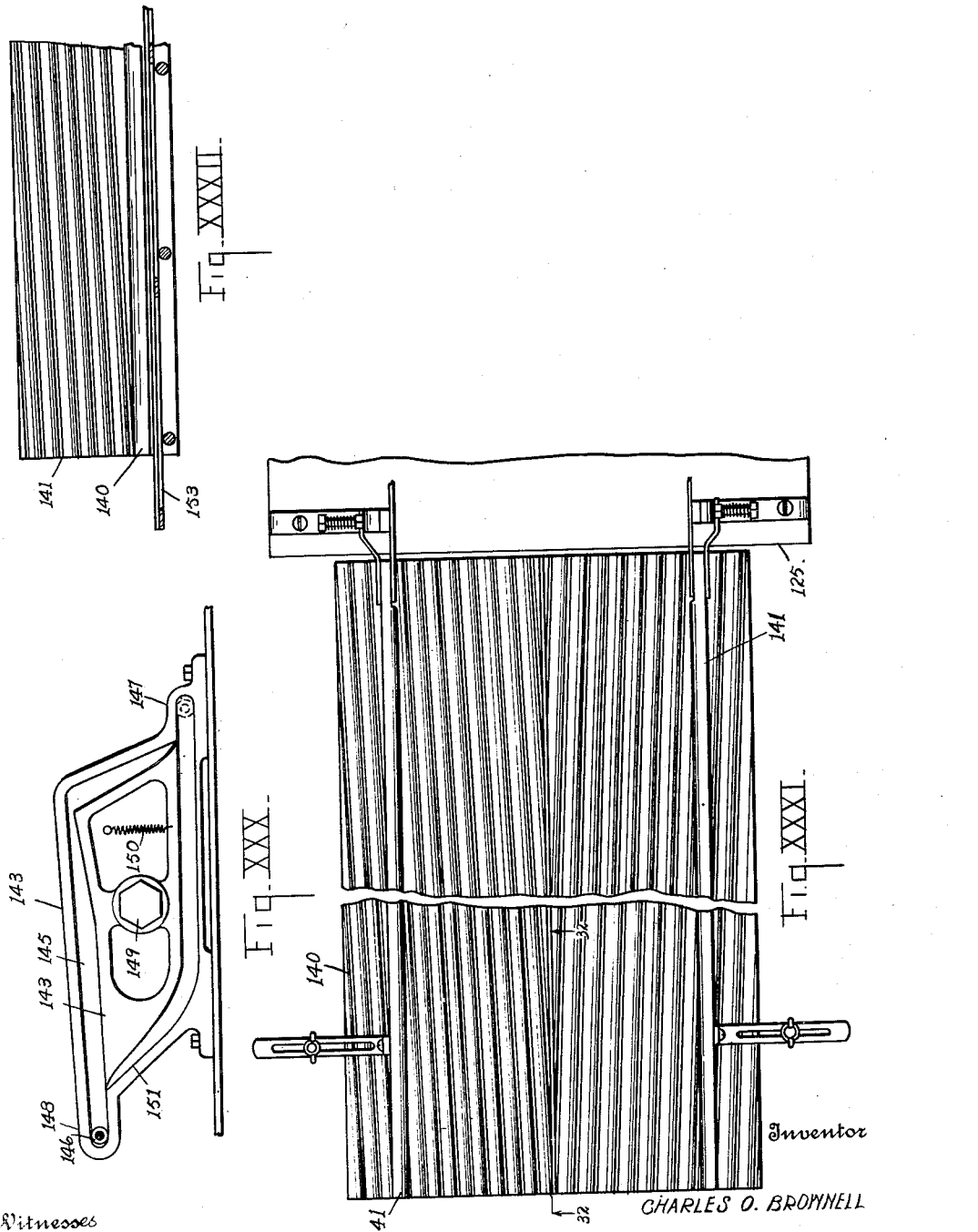

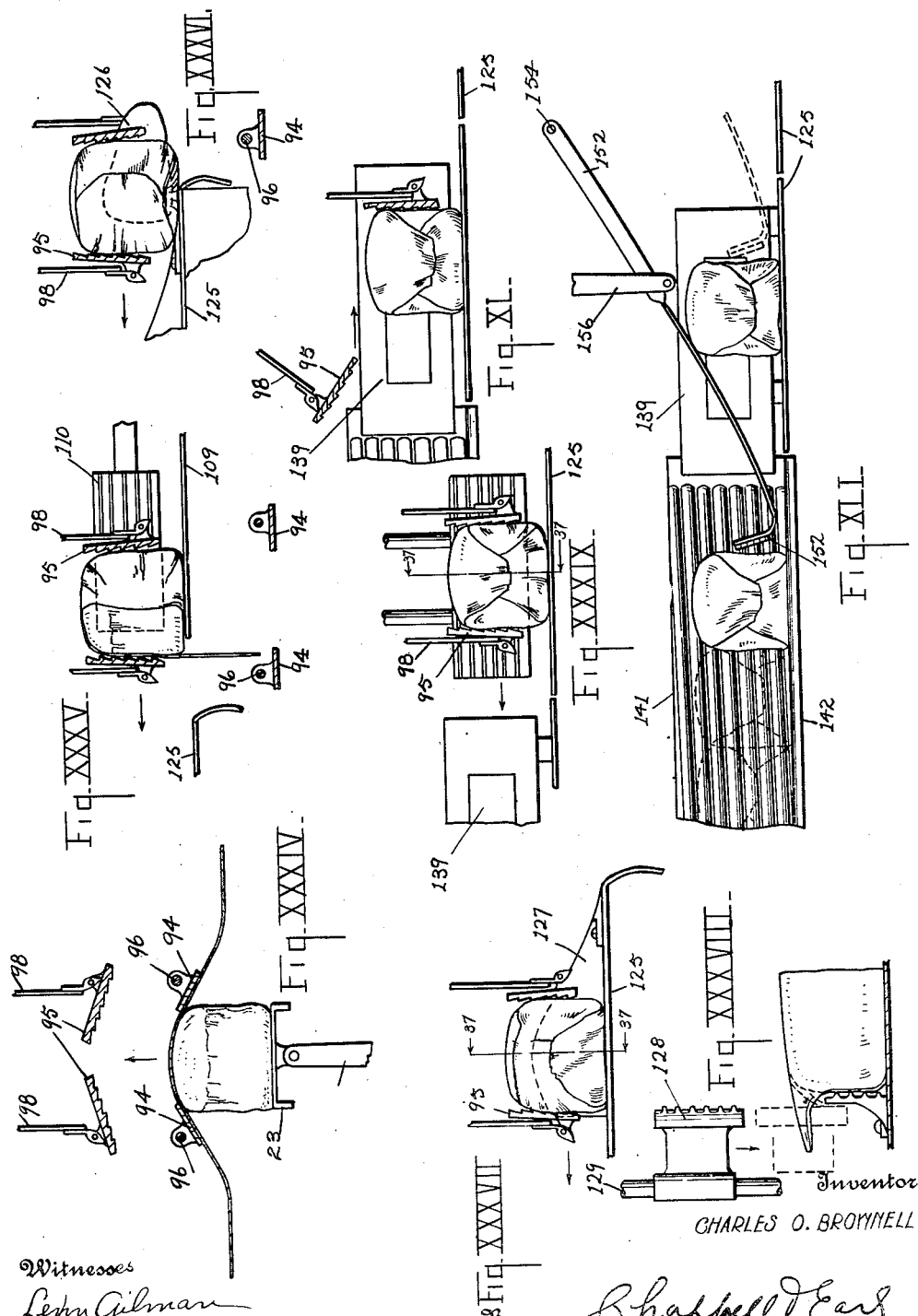

UNITED STATES PATENT OFFICE.

CHARLES O. BROWNELL, OF BATTLE CREEK, MICHIGAN.

WRAPPING MACHINE.

1,416,165.  Specification of Letters Patent.  Patented May 16, 1922.

Application filed August 2, 1918. Serial No. 247,931.

*To all whom it may concern:*

Be it known that I, CHARLES O. BROWNELL, a citizen of the United States, residing at Battle Creek, county of Calhoun, State of Michigan, have invented certain new and useful Improvements in Wrapping Machines, of which the following is a specification.

This invention relates to improvements in wrapping machines.

My improvements are especially designed by me and I have illustrated the same embodied in a machine for wrapping bread. My improvements are, however, capable of embodiment and various features are desirable when embodied in machines for wrapping other articles.

The main objects of this invention are:

First, to provide an improved wrapping machine which is quite compact and at the same time of large capacity.

Second, to provide in a wrapping machine an improved means for delivering the articles to be wrapped to the wrapping mechanism and advancing the same through the wrapping mechanism.

Third, to provide in a wrapping machine an improved wrapping mechanism.

Fourth, to provide an improved wrapping and feeding mechanism well adapted for the handling of loaves of bread and other comparatively delicate articles.

Fifth, to provide an improved wrapping machine which may be conveniently adjusted to articles of different dimensions.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Fig. I, Sheet 1, is a plan view of a structure embodying the features of my invention, a portion of the conveyor being broken away.

Fig. II, Sheet 2, is a detail side elevation of the left side of the machine.

Fig. III, Sheet 3, is a detail side elevation of the right side of the machine.

Fig. IV, Sheet 4, is a detail longitudinal section on a line corresponding to line 4—4 of Fig. VI.

Fig. V, Sheet 5, is a detail elevation of the rear end of the machine.

Fig. VI, Sheet 6, is a detail elevation of the front end of the machine.

Fig. VII, Sheet 5, is a detail transverse section on a line corresponding to line 7—7 of Figs. I, II, and IV, showing details of the automatic trip.

Fig. VIII, Sheet 7, is a detail perspective of the rear end of the machine showing details of the folder and of the paper feed mechanisms.

Fig. IX, Sheet 8, is a detail perspective view of certain of the parts shown in Fig. VIII.

Fig. X, Sheet 9, is a detail view of parts of the driving mechanism shown in Fig. IX, partially in section on line 10—10 of Figs. II, V, and XII.

Fig. X$^A$, Sheet 9, is an enlarged detail of the paper feed control means.

Fig. XI, Sheet 8, is a detail section of the driving mechanism on a line corresponding to line 11—11 of Fig. X.

Fig. XII, Sheet 8, is a detail section of parts of the driving and control mechanism on a line corresponding to line 12—12 of Fig. I.

Fig. XIII, Sheet 5, is a detail section on a line corresponding to line 13—13 of Figs. IV, X, and XV, showing details of the paper feed.

Fig. XIV, Sheet 9, is a detail perspective view of parts of the paper feed and cutting mechanism.

Fig. XV, Sheet 9, is a detail vertical section on a line corresponding to line 15—15 of Figs. I, and V, showing further details of the paper feed and cutting mechanism.

Fig. XVI, Sheet 9, is a detail side elevation of the paper knife.

Fig. XVII, Sheet 6, is a detail section on a line corresponding to line 17—17 of Fig. XVIII, showing details of one of the operating cams.

Fig. XVIII, Sheet 6, is a detail view partially in section on a line corresponding to line 18—18 of Figs. I, III, XIV and XVII, showing details of the driving mechanism.

Fig. XIX, Sheet 6, is an outer side view of the outer cam member shown in Fig. XVIII.

Fig. XX, Sheet 6, is an outer side view of the inner cam member shown in Fig. XVIII.

Fig. XXI, Sheet 10, is a detail perspective view of parts of the feeding and folding driving means.

Fig. XXII, Sheet 10, is a detail view partially in section on a line corresponding to line 22—22 of Figs. III, VI, XXI, and XXIII.

Fig. XXIII, Sheet 10, is a detail section on a line corresponding to line 23—23 of Figs. I, III, and XXII.

Fig. XXIV, Sheet 10, is a detail section on a line corresponding to line 24—24 of Figs. I, and XXII.

Fig. XXV, Sheet 10, is an enlarged detail section on a line corresponding to line 25—25 of Fig. XXIII.

Fig. XXVI, Sheet 10, is a detail section on a line corresponding to line 26—26 of Fig. VI.

Fig. XXVII, Sheet 11, is a detail perspective view of parts of the feed and wrapping mechanism.

Fig. XXVIII, Sheet 12, is a detail perspective view of certain of the parts illustrated in Fig. XXVII in another position.

Fig. XXIX, Sheet 10, is a view of the cam for actuating the carriage shown in Figs. XXVII and XXVIII extended.

Fig. XXX, Sheet 13, is a front view of the control cam for the front gripper member.

Fig. XXXI, Sheet 13, is a plan view of the bottom cooling plate.

Fig. XXXII, Sheet 13, is a detail section on a line corresponding to line 32—32 of Figs. VI, and XXXI, showing in detail one of the side cooling plates and certain details of the delivery rack or table.

Fig. XXXIII, Sheet 5, is a detail section on a line corresponding to line 33—33 of Fig. IV, showing details of the transfer plunger driving mechanism.

Fig. XXXIV, Sheet 14, is a detail view showing details of the article transfer means and the initial step in wrapping the article.

Fig. XXXV, Sheet 14, is a detail view illustrating one wrapping step or position.

Fig. XXXVI, Sheet 14, is a detail view illustrating the parts in another wrapping step or position.

Fig. XXXVII, Sheet 14, is a detail view showing further details of the end flap folding mechanism.

Fig. XXXVIII, Sheet 14, is a detail view partially in section on a line corresponding to line 38—38 of Figs. XXXVII and XXXIX, showing further details of the end flap folding mechanism.

Fig. XXXIX, Sheet 14, is a detail view of the end flap folding mechanism shown in Fig. XXXVIII in another position.

Fig. XL, Sheet 14, is a detail view showing the completely wrapped article in relation to the heating plate.

Fig. XLI, Sheet 14, is a detail view taken on a line corresponding to line 41—41 of Fig. I, showing details of the feed means and the relation of the cooling plates to the heating plate.

In the drawing, similar reference characters refer to similar parts throughout the several views, and the sectional views are taken looking in the direction of the little arrows at the ends of the section lines.

Referring to the drawing, the frame of the machine is designated by the numeral 1 and is built up of suitable castings and bars to provide a rigid support for the various shafts, ways, and movable parts. The details of the frame form no part of this invention and therefore it is not further described.

I preferably drive my machine by means of an electric motor shown conventionally at 2.

The bread or other articles to be wrapped are introduced and also discharged at the front end of the machine. The feed conveyor illustrated comprises a pair of sprocket chains 3 travelling over driving and supporting sprockets 4 and 5 at the rear end of the machine and the sprockets 6 at the front end of the machine.

A conveyor way or article support 7 formed of a plurality of longitudinal bars is provided so that the articles are engaged and carried along thereon by the flights, the articles being placed upon the way by the operator. While the machine is in operation this conveyor is continuously driven with a step by step movement.

In the structure illustrated the conveyor is driven from the motor, the driving connections being through the belt 8 to the pulley 9 fixed to the sleeve shaft 10 rotatably mounted on the shaft 11,—see Figs. III and VI. The sleeve shaft 10 is connected by a train of gears 12, 13, 14, and 15, to the shaft 16,—see Figs. II, VI and XXVI.

The shaft 16 is provided with a sprocket 17,—see Fig. VI, which is connected by a sprocket chain 18 to the sprocket 19 on the shaft 20 towards the other end of the machine,—see Figs. V and VI. This shaft 20 has a mutilated gear 21 thereon coacting with a gear 22 on the shaft 4′ for the conveyor sprockets 4, the conveyor sprockets 4 being the driving sprockets for the conveyor.

This driving connection, as stated, advances the conveyor step by step and is arranged so that it comes to rest with the articles to be wrapped above the transfer plunger 23,—see Figs. III and IV. This transfer plunger reciprocates vertically, being guided in its movement by the rods 24 reciprocating in the bearings or guides 25 carried by the cross member 26,—see Figs. III, IV and V.

The movement of this transfer plunger is timed with the conveyor, the transfer plunger being actuated by the lever 27 mounted on the rock shaft 28 and having an arm 29 coacting with the cam 30 on shaft 16, the driving connections of which have been described,—see Figs. IV and VI.

The wrapping paper 31 is fed into the machine from a roll 32 mounted at the rear of the machine. The paper 31 is led between a pair of feed rolls 33 and 34,—see Figs. IV and XV, from which it is delivered to the knife 35 coacting with the shear bar 36.

The feeding of the paper and the actuation of the mechanism for feeding the articles through the folding mechanism is controlled by the articles upon the conveyor, a trip 37 being positioned to be engaged by the articles as they are carried along on the conveyor way by the flights,—see Figs. IV and VII, the flights being notched at 38,—see Fig. VII, so as to pass the trip and permit it to be engaged by the articles. This trip 37 is mounted on the rock shaft 39 and provided with a counter-balance or return weight 40, best shown in Fig. IV.

The rock shaft has an arm 41 connected by the link 42 to a release lever 43,—see Figs. I, VII, IX, XI and XII. This release lever is pivoted at 44 and provided with a lug 45 adapted to swing under the dog 46 holding it normally against the driving dog 47 pivoted at 48 on the driving disk 49 to coact when released with a driving lug 50 on the gear 51. The lever 43 is pivoted on the arm 52 and is provided with a spring 53 urging it to engaging position.

The driving disk 49 is provided with a sprocket wheel 54 connected by the sprocket chain 55 to a sprocket 56 on the shaft 20. The driving disk 49 is continuously driven but through the means described the gear 51 is driven only when articles to be wrapped are being fed into the machine. This gear 51 is connected by a train of gears 57, 58, and 59, and the clutch 60 to the paper feed shaft 61 of the paper feed roll 33. This clutch 60 is controlled by the lever 62 pivoted at 63 and disposed so that it is engaged by a tripping cam 64 on the arm 52,—see Figs. X, X<sup>A</sup>, and XII. The clutch is urged to engaging position by the coiled spring 65,—see Fig. X.

To prevent overthrow or over feeding of the paper when the clutch is disengaged I provide a brake consisting of the linked brake band 66 connected to the frame at 67 and passed around the drum 68 on the feed roll shaft 61. The other end of this brake band is connected by the spring 69 and the rod 70 to the frame, the rod having a stop 71 threaded thereon for adjustment to be engaged by the arm 52 so that when this arm is actuated the pull of the spring on the band is released and the brake is released,—see Fig. XII.

The paper is, as stated, fed from the feed rolls to the knife 35. This knife is carried by the arms 72 on the rock shaft 73 which also carries the arm 52.

This rock shaft is actuated by the cam 74 on the shaft 75 to which the gear 51 is keyed so that this shaft is driven only when paper is being fed into the machine through the feed means described. This rock shaft has an arm 76 carrying a roller 77 riding on the periphery 78 of the cam 74,—see Fig. XIV.

To vary the lengths of the sheets the cam 74 is formed of two members 79 and 80, both cam members having raised portions or cam projections, the member 80 being adjustably secured to the member 79 by means of the bolt 81 engaging the segmental slot 82 in the member 80, see Figs. XIV, XVII, XIX and XX, a clamping nut 83 being also provided for securing these cam members in their adjusted position. By this arrangement it will be observed that the cam projection of the outer member may be positioned to register with the cam projections or raised portion of the member 79 or so as to cover a portion of the dwell thereof, thus lengthening the time between the actuation of the knife and thus lengthening the sheets.

The sheets are delivered from the feed rolls onto the feed belts 84,—see Fig. IV. The upper reaches of these feed belts are supported by a plate 85 and the paper is held yieldingly thereon by the pressure roller 86 carried by the arms 87 pivoted at 88. Adjustable feed rollers 89 are also provided, the spindles of these being engaged in rack-like supports 90 so that they may be shifted along or more than one roller of this character provided if desired.

The belts 85 are carried by pulleys 160 and 161 on the sleeve shaft 162 and shaft 163. The shaft 162 is driven from the shaft 60 by means of the belt 164 and the pulley 165,—see Fig. IV.

The sheets of paper are projected across the path of the transfer plunger 23, the sheet being supported by the bars 91 at its side edges with its front edge against the stop 92.

A guard plate 93 prevents the center of the front edge of the sheet sagging down so as to be engaged by the article to be wrapped as it is carried to position to be engaged by the transfer plunger. The paper stops as soon as its rear edge passes from the roller 89 and this roller is supported, as stated, adjustably to accommodate the different sized sheets.

The transfer plunger, the actuation of which has been described, carries the article upward against the paper and continuing carries the article and the paper upward between the pivoted wrapping plates 94,—see Figs. IV and XXXIV. These wrapping plates hold the paper comparatively close to the top and sides of the article as it is carried into the pivoted grippers 95. The wrapper plates 94 are mounted on the pivot rods 96 adjustably supported in the toothed or rack-like supports 97,—see Figs. III and IV, permitting the adjustment to articles of different size.

The grippers 95 are pivotally mounted on arms 98. The arms 98 are carried by cross members 99 on a carriage, designated generally by the numeral 100, mounted to reciprocate upon the rod-like ways 101. This carriage comprises a pair of crossheads 102 having bearings at their ends slidably engaging the ways and connected by the rods 103 on which one of the cross members 99 is adjustably mounted. The front cross member 99 is carried by a pair of rods 104, the outer ends of which are secured to the crosshead 105 and the inner ends to a cross piece 106 having ears engaging the pivot rod 107 on the central crosshead 102, the crosshead 105 being adapted to have sliding engagement with the ways 101 when in its lowered position, but being capable of being swung away from the same as shown in Fig. XXVIII.

To adapt the grippers to different sized articles the cross pieces 99 are adjusted on the carriage by means of the screws 108. The means for reciprocating the carriage will be described later.

After the article is delivered to the grippers as shown in Fig. XXXV the rear side of the sheet and the rear end flaps are folded forwardly by means of the folders 109 and 110 which are reciprocated forwardly to engage the wrapper while the carriage is in its initial position.

These flap folders 109 and 110 are carried by a carriage 111 mounted to reciprocate on rod-like ways 112,—see Figs. I and VIII. This carriage 111 is reciprocated by the lever 113 connected by the link 114 to the carriage and pivoted at 115 on the frame. The other end of the lever 113 is connected by a link 116 to a lever 117 pivoted on the frame at 118 and actuated by the cam 119 on the shaft 120. The driving connections of this shaft 120 will be hereinafter described.

The end folders 110 are mounted on the rod 123 and the right and left hand screw 124 so that the folders may be adjusted to articles of different lengths. After the flap folder carriage 111 has been actuated to fold the rear bottom and rear end flaps the carriage 100 is actuated carrying the article past the front side folder 125 and front end flap folders 126. These flap folders being stationary.

As the loaf is carried forwardly over the plate 125 the front side flap is folded upon the rear side flap. As the article is carried along further it is engaged by the bottom end flap turners 127 and the bottom end flaps are turned upwardly against the previously folded front and rear end flaps. The top flaps are then turned by the reciprocating flap folders 128. The reciprocating flap folders 128 are mounted to reciprocate on the rods 129 and are actuated by the link 130 connected at its lower end to the lever 131 pivoted at 132 and actuated by the cam 133 on the cam shaft 120,—see Figs. III, IV, XXXIII, XXXVIII and XXXIX.

The carriage 100 is reciprocated by the cam 134 on the shaft 11, the cam acting upon the arm 135 of the vertically disposed rock shaft 136,—see Fig. VI. On its upper end the rock shaft is provided with an arm 137 connected to the carriage by the link 138.

As the wrapped article is carried forward from the last wrapping position it is carried between the sealing plates 139 and from them upon the cooling plate 140 and between the end cooling plates 141. The heating plates are adjusted to and from each other by means of the screw 142. The plates illustrated are designed to be electrically heated, but as these details form no part of this invention they are not further described herein.

As the carriage 100 approaches the rear end of its stroke the rear gripper is tilted or swung away from the article to release the same. This is effected by means of a control cam consisting of a fixed cam member 143 and a coacting tilting cam member 144 mounted within the same and coacting therewith to provide a cam groove 145 for the roller 146,—see Fig. XXVIII. The cam member 143 has a cam groove extension 147 at its lower front corner and a corresponding cam groove extension 148 at its upper rear corner adapted to receive the roller 146 at the limits of the stroke of the carriage.

The cam member 144 is pivoted at 149 and is held by a spring 150 with its rear end normally downward so that as the carriage nears the rear of its stroke as shown in Fig. XXVIII the roller rides up the rear incline of the cam member 143 under the rear end of the cam member 144, the groove 148 swinging up or opening the gripper. On the return stroke of the carriage the roller 146 travels over the cam member 144 holding the gripper in its tilted or raised position until the front end of the control cam is reached when it is carried down the inclined front end of the cam member and into the horizontal portion 147 which brings the gripper to its vertical operative position. On the rearward stroke of the carriage the roller 146 travels below the cam member 144 until the inclined portion 151 is again reached when it travels up this inclined portion tilting the gripper member and passing under the rear end of the cam member and allowing it to drop into position to support the gripper in tilted position during the return stroke of the carriage.

The carriage is also provided with a pusher 152 which projects down in front of the grippers to engage the article discharged by the grippers on the previous carriage stroke and push it onto the cooling plates, the articles being pushed along step by step onto the table 153 from which they may be packed or otherwise disposed of. The pusher 152 is pivotally supported at 154 so that on the return stroke it passes over the article discharged from the grippers.

The pusher arms 152' are spaced so that the front gripper swings between them. The arms are supported by the stop 155 carried by the hanger 156.

The means for driving and controlling the shaft 11 on which the cam 134 is mounted comprises the shaft 16 to which a driving disk-like member 166 is keyed. A driven wheel or member 167 recessed to receive the driving disk has a peripheral slot 168 in which is pivoted a driving dog 169 adapted to engage the driving disk and lock it to the driven member.

A spring 170 normally urges the dog into engaging position. This dog is disengaged by the release member 171 pivoted at 172 and urged to engaging position by the spring 173 so that it rides on the periphery of the driven member 167 as shown in Fig. XXI to engage the pin 174 projecting from the dog as the driven member is rotated.

The release member is actuated by the cam 175 which is in turn actuated by the lever 176, the upper end of which is connected by the link 177 to a lever 178 pivoted at 179 and actuated by the cam groove 180 on the inner face of the cam 74,—see Figs. I, XVII, XVIII, and XXI.

When actuated through the connections described the member 171 is swung out of engagement with the pin 174 allowing the dog to drop into engaging position thereby connecting the driven member 167 with the driving member.

The periphery of the driving member on which the release member 171 rides, as stated, has a peripheral recess 181 therein into which the release member 171 drops when actuated so that as the driven member continues to rotate the release member is brought to position to again disengage the dog as the driven member completes its revolution. The driven member has a sprocket wheel 182 connected thereto, the sprocket wheel being connected by the sprocket chain 183 to a sprocket wheel 184 on the shaft 11. The driven member also has a sprocket wheel 185 secured thereto and connected by the sprocket chain 186 to a sprocket wheel 187 on the shaft 120. This shaft carries the cam 133 which actuates the flap folders 128 and also the cam 119 which actuates the flap folder carriage 111, as has been described.

The cooling plates 140 and 141 have ribbed faces, the ribs being inclined to the longitudinal planes of the plates so that as the wrapped and sealed articles are pushed along over the plates a smoothing effect is secured drawing the wrapper more firmly about the article and thus overcoming the tendency for the flaps to separate before the heated wax has had an opportunity to set.

It will be observed that the operation of my improved machine is entirely automatic, the operator merely placing the articles upon the feed conveyor and removing them from the discharge table.

To recapitulate the movements of the articles through the machine: The articles are placed upon the feed conveyor way 7 along which they are carried by the flights to a position above the transfer conveyor 23. As they are carried along they engage the control trip 37 which, through the connections described, actuates the paper feed and paper cutting means to feed, cut and deliver a sheet of paper across the path of the transfer plunger so that when the transfer plunger is actuated it is carried against the outer side of the paper pushing it between the folder blades 94 and into the gripping jaws 95 of the folder feed carriage. This wraps the sheet over the top front and rear sides of the article.

Through the mechanisms described the actuation of the folder carriage 111 is properly timed to fold the rear edge of the sheet under the article and to fold the rear side flaps forwardly by means of the folders 109 and 110. The actuation of the folder carriage is so timed that this folding takes place while the carriage is in its initial position. As soon as this folding is accomplished the carriage is actuated through the mechanism described to carry the article forward past the front end flap folders 126 and onto the folder plate 125 which wraps the front edge of the sheet over the previously wrapped rear edge and folds the front end flaps rearwardly upon the previously folded rear end flaps. The continued forward movement of the feed carriage brings the bottom end flaps into engagement with the flap folders 127 by which they are turned upwardly and the top flaps are engaged by the reciprocating folders 128, the movement of which is timed through the mechanism described. The article is then carried to the heating or sealing plates and the front gripper released through the control cam mechanism described, the succeeding movement of the carriage engaging the pusher 152 with the article and pushing it and the previously wrapped articles forward step by step on the cooling plates and onto the table 153 from which they are removed as may be desired.

My improved wrapping machine is well adapted for the handling of comparatively delicate articles such as loaves of bread and, through the adjustments described, may be adjusted to different sized loaves or articles. The machine is of large capacity and the articles are very neatly wrapped.

I have illustrated my improvements as I have embodied the same in a wrapping and sealing machine for the wrapping of bread. Certain features thereof are described and I have embodied the same in machines for wrapping and tying the wrapped articles instead of sealing them. In my co-pending application I show such an adaptation. I have not attempted to illustrate or describe various modifications in structural details which I contemplate and which might be desirable for certain adaptations and embodiments, as I believe the disclosure made will enable those skilled in the art to which my invention relates to embody or adapt the same as may be desired.

Having thus described my invention, what I claim as new and desire to secure by Letters Patent, is:

1. In a wrapping machine, the combination of an endless feed conveyor driven with a step by step movement, a reciprocating feed carriage provided with depending gripper arms, the front gripper arm being pivoted, a transfer plunger, a pair of grippers to which the article is delivered by said transfer plunger, pivotally mounted on said gripper arms, a paper feed means for delivering a sheet of paper between said feed carriage and feed conveyor, pivoted wrapping members disposed below said grippers and in close proximity to the sheet so that the article is carried between them by the transfer plunger and the paper wrapped over the top and sides of the article as it is delivered to the grippers, means for adjustably supporting said wrapping members and gripper arms, reciprocating primary bottom and end flap folders disposed at the rear of said grippers when the carriage is in its receiving position, secondary bottom and end flap folders positioned to act upon and fold the bottom and the front and bottom end flaps as the carriage is actuated, vertically reciprocating top end flap folders positioned to fold the top end flap, means for adjusting said end flap folders, and means for swinging the front gripper arm above the wrapped article on the return movement of the feed carriage.

2. In a wrapping machine, the combination of an endless feed conveyor driven with a step by step movement, a reciprocating feed carriage provided with depending gripper arms, the front gripper arm being pivoted, a transfer plunger, a pair of grippers to which the article is delivered by said transfer plunger, pivotally mounted on said gripper arms, a paper feed means for delivering a sheet of paper between said feed carriage and feed conveyor, pivoted wrapping members disposed below said grippers and in close proximity to the sheet so that the article is carried between them by the transfer plunger and the paper wrapped over the top and sides of the article as it is delivered to the grippers, reciprocating primary bottom and end flap folders disposed at the rear of said grippers when the carriage is in its receiving position, secondary bottom and end flap folders positioned to act upon and fold the bottom and the front and bottom end flaps as the carriage is actuated, vertically reciprocating top end flap folders positioned to fold the top end flap, and means for swinging the front gripper arm above the wrapped article on the return movement of the feed carriage.

3. In a wrapping machine, the combination of an endless feed conveyor driven with a step by step movement, a reciprocating feed carriage provided with depending gripper arms, the front gripper arm being pivoted, a transfer plunger, a pair of grippers to which the article is delivered by said transfer plunger, carried by said gripper arms, a paper feed means for delivering a sheet of paper between said feed carriage and feed conveyor, means for adjustably supporting said wrapping members and gripper arms, reciprocating primary bottom and end flap folders disposed at the rear of said grippers when the carriage is in its receiving position, secondary bottom and end flap folders positioned to act upon and fold the bottom and the front and bottom end flaps as the carriage is actuated, vertically reciprocating top end flap folders positioned to fold the top end flap, means for adjusting said end flap folders, and means for swinging the front gripper arm above the wrapped article on the return movement of the feed carriage.

4. In a wrapping machine, the combination of an endless feed conveyor driven with a step by step movement, a reciprocating feed carriage provided with depending gripper arms, the front gripper arm being pivoted, a transfer plunger, a pair of grippers to which the article is delivered by said transfer plunger, carried by said gripper arms, a paper feed means for delivering a sheet of paper between said feed carriage and feed conveyor, reciprocating primary bottom and end flap folders disposed at the rear of said grippers when the carriage is in its receiving position, secondary bottom and end flap folders positioned to act upon and fold the bottom and the front and bottom end flaps as the carriage is actuated, vertically reciprocating top end flap folders positioned to fold the top end flap, and means for swinging the front gripper arm above the wrapped article on the return movement of the feed carriage.

5. In a wrapping machine, the combination of an endless feed conveyor driven with a step by step movement, a reciprocating feed carriage provided with depending gripper arms, the front gripper arm being pivoted, a transfer plunger, a pair of grippers to which the article is delivered by said transfer plunger, carried by said gripper arms, a paper feed means for delivering a sheet of paper between said feed carriage and feed conveyor, reciprocating primary bottom and end flap folders disposed at the rear of said grippers when the carriage is in its receiving position, secondary bottom and end flap folders positioned to act upon and fold the bottom and the front and bottom end flaps as the carriage is actuated, vertically reciprocating top end flap folders positioned to fold the top end flap, means for swinging the front gripper arm above the wrapped article on the return movement of the feed carriage, and a pusher pivotally mounted on said carriage and projecting in front of the grippers to advance the previously wrapped article on the feed stroke of the carriage and to pass over the article delivered by the grippers on the return stroke.

6. In a wrapping machine, the combination of a reciprocating feed carriage provided with article grippers, wrapping members disposed in alignment with said grippers when the carriage is in its receiving position, means for delivering paper in front of said wrapping members, means for delivering the article to be wrapped against the paper so that the paper is wrapped over the top and sides of the article as it is delivered between said wrapping members to the grippers, means for adjustably supporting said wrapping members and grippers, reciprocating primary bottom and end flap folders disposed at the rear of said grippers when the carriage is in the receiving position, secondary bottom and end flap folders positioned to act upon and fold the bottom and the front and bottom end flaps as the carriage is actuated, means for adjusting said secondary folder, vertically reciprocating top end flap folders positioned to fold the top end flap, and means for releasing the article at the end of the feed stroke of the carriage.

7. In a wrapping machine, the combination of a reciprocating feed carriage provided with article grippers, wrapping members disposed in alignment with said grippers when the carriage is in its receiving position, means for delivering paper in front of said wrapping members, means for delivering the article to be wrapped against the paper so that the paper is wrapped over the top and sides of the article as it is delivered between said wrapping members to the grippers, reciprocating primary bottom and end flap folders disposed at the rear of said grippers when the carriage is in its receiving position, secondary bottom and end flap folders positioned to act upon and fold the bottom and the front and bottom end flaps as the carriage is actuated, vertically reciprocating top end flap folders positioned to fold the top end flap, and means for releasing the article at the end of the feed stroke of the carriage.

8. In a wrapping machine, the combination of a feed conveyor driven with a step by step movement, a reciprocating feed carriage provided with depending gripper arms, the front arm being pivoted, a transfer plunger, a pair of grippers to which the article is delivered by said transfer plunger, mounted on said gripper arms, a paper feed means for delivering a sheet of paper between said feed carriage and feed conveyor, means for swinging the front gripper arm above the wrapped article on the return movement of the feed carriage, and a pusher pivotally mounted on said carriage and projecting in front of the grippers to advance the previously wrapped article on the feed stroke of the carriage and to pass over the article delivered by the grippers on the return stroke.

9. In a wrapping machine, the combination of a reciprocating carriage provided with a pair of grippers, the front gripper being pivoted to swing above the articles transferred, means for delivering articles to said grippers, means for swinging the front gripper above the wrapped article on the return movement of the feed carriage, and a pusher pivotally mounted on said carriage and projecting in front of the grippers to advance the previously wrapped article on the feed stroke of the carriage and to pass over the article delivered by the grippers on the return stroke.

10. In a wrapping machine, the combination of ways, a carriage reciprocating on said ways and comprising front and rear members, the front member being pivoted on the rear, arms mounted on said carriage members and having grippers pivotally mounted thereon, means for adjusting said arms on said carriage members, a control cam for the pivoted carriage member comprising a fixed cam member and a rocking member disposed therein to provide a cam way having an upwardly inclined portion at its rear end and a downwardly inclined portion at its front end, the front carriage member being provided with a roller traveling in said cam way so that on the forward stroke of the carriage the front carriage member is elevated at the rear end of the feed stroke and held in elevated position to pass over the article delivered on the rear stroke of the carriage, and means for reciprocating said carriage.

11. In a wrapping machine, the combination of ways, a carriage reciprocating on said ways and comprising front and rear members, the front member being pivoted on the rear, arms mounted on said carriage members and having grippers pivotally mounted thereon, a control cam for the pivoted carriage member comprising a fixed cam member and a rocking member disposed therein to provide a cam way having an upwardly inclined portion at its rear end and a downwardly inclined portion at its front end, the front carriage member being provided with a roller traveling in said cam way so that on the forward stroke of the carriage the front carriage member is elevated at the rear end of the feed stroke and held in elevated position to pass over the article delivered on the rear stroke of the carriage, and means for reciprocating said carriage.

In witness whereof, I have hereunto set my hand and seal in the presence of two witnesses.

CHARLES O. BROWNELL. [L. S.]

Witnesses:
JAMES G. REDNER,
NEVA I. BURDUE.